United States Patent
Kim et al.

(10) Patent No.: US 9,800,085 B2
(45) Date of Patent: Oct. 24, 2017

(54) APPARATUS FOR CONTROLLING SOLAR CHARGING AND METHOD THEREFOR

(71) Applicant: MIJI ENERTECH CO., LTD, Daegu (KR)

(72) Inventors: Berm Soo Kim, Daegu (KR); Hye Rin Hwang, Daegu (KR); Jin Sung Jeon, Daegu (KR); Jung Ki Kim, Daegu (KR)

(73) Assignee: MIJI ENERTECH CO., LTD, Dalseo-gu, Dae ju (KR)

( * ) Notice: Subject to any disclaimer, the term of this patent is extended or adjusted under 35 U.S.C. 154(b) by 137 days.

(21) Appl. No.: 14/942,022

(22) Filed: Nov. 16, 2015

(65) Prior Publication Data

US 2016/0204649 A1 Jul. 14, 2016

(30) Foreign Application Priority Data

Jan. 8, 2015 (KR) .................. 10-2015-0002710

(51) Int. Cl.
*H02J 7/35* (2006.01)
*F21S 9/03* (2006.01)
*F21Y 115/10* (2016.01)

(52) U.S. Cl.
CPC .............. *H02J 7/35* (2013.01); *F21S 9/035* (2013.01); *F21Y 2115/10* (2016.08)

(58) Field of Classification Search
CPC ........................................... H02J 7/35
USPC ........................................... 320/101
See application file for complete search history.

(56) References Cited

U.S. PATENT DOCUMENTS

| | | | | |
|---|---|---|---|---|
| 4,384,317 A * | 5/1983 | Stackpole | ............... | F21S 9/032 136/291 |
| 7,859,431 B2 * | 12/2010 | Peddie et al. | ........... | E01F 9/559 340/907 |
| 8,457,798 B2 * | 6/2013 | Hackett | ............. | G05B 19/4185 455/41.2 |
| 9,444,285 B2 * | 9/2016 | Kamiya et al. | ......... | H02J 7/025 |
| 2007/0103324 A1 * | 5/2007 | Kosuge et al. | ........... | E03F 7/00 340/618 |

(Continued)

FOREIGN PATENT DOCUMENTS

| JP | 2005-160211 A | 6/2005 |
|---|---|---|
| JP | 2013-181375 A | 9/2013 |
| JP | 2013-214463 A | 10/2013 |

*Primary Examiner* — Sun Lin
(74) *Attorney, Agent, or Firm* — Ladas & Parry LLP

(57) ABSTRACT

Disclosed are solar charging control apparatuses and methods for the same. An apparatus for controlling solar power charging includes a main controller controlling charge/discharge of a battery storing power generated in a solar cell in order to protect overcharge and overdischarge of the battery; and a secondary controller maintaining a sleep mode when a terminal voltage of the battery is not less than a threshold voltage and reviving the main controller by using power generated in the solar cell when the terminal voltage of the battery is less than the threshold voltage. Therefore, even when the main controller of the solar charging control apparatus is downed, the solar charging control apparatus can be ordinarily operated by using power generated by solar cells. Also, costs demanded for managing a solar charging system which is installed in a remote place can be saved.

9 Claims, 3 Drawing Sheets

(56) References Cited

U.S. PATENT DOCUMENTS

| 2011/0181233 A1* | 7/2011 | Mino et al. | H02J 7/0027 |
| | | | 320/101 |
| 2012/0187897 A1* | 7/2012 | Lenk et al. | H01M 10/44 |
| | | | 320/101 |
| 2016/0156203 A1* | 6/2016 | Han et al. | H02J 7/007 |
| | | | 320/101 |

* cited by examiner

ND METHOD THEREFOR

APPARATUS FOR CONTROLLING SOLAR CHARGING AND METHOD THEREFOR

CROSS-REFERENCE TO RELATED APPLICATIONS

This application claims priority to Korean Patent Application No. 10-2015-0002710 filed on Jan. 8, 2015 in the Korean Intellectual Property Office (KIPO), the entire contents of which are hereby incorporated by reference.

BACKGROUND

1. Technical Field

The present disclosure relates to apparatuses and methods for controlling solar charging, and more particularly, to apparatuses and methods for ordinarily operating a solar charging system even when a failure occurs in a main controller of the solar charging system.

2. Related Art

A solar streetlamp system is a streetlamp system using solar power to brighten streets. Once sunlight is provided, a solar charging controller charges a battery with power generated in a solar cell (e.g., for a sunshine period). If sunlight is not provided, the solar charging controller turns on a light emitted diode (LED) streetlamp with power stored in a battery (e.g., for a night period).

According to a long-time operation of the LED streetlamp, the battery may be dead, and an output voltage of the battery may become below a threshold voltage. Thus, the solar charging controller powered by the battery may be turned off, and the system may be downed. For example, a battery management system (BMS) may cut off the power supplied to the solar charging controller when the voltage of the battery becomes below the threshold voltage.

Then, even when the sunlight becomes available again, since the solar charging controller does not operate, the solar streetlamp system cannot work correctly. In this case, a service personnel should manually charge the battery and reset the solar charging controller to operate again. However, in case that the solar charging controller is installed in a remote place, it may be difficult to perform the service process properly.

SUMMARY

Accordingly, exemplary embodiments of the present invention are provided to substantially obviate one or more problems due to limitations and disadvantages of the related art. Exemplary embodiments of the present invention provide apparatuses and methods for controlling solar power charging which can perform a failover of a solar power charging system by using power generated in solar cells when the solar power charging system is downed due to dead battery.

In order to achieve the objectives of the present invention, an apparatus for controlling solar charging may be provided. The apparatus may comprise a main controller controlling charge/discharge operations of a battery storing power generated in a solar cell in order to protect overcharge and overdischarge of the battery; and a secondary controller maintaining a sleep mode when a terminal voltage of the battery is not less than a threshold voltage and reviving the main controller by using power generated in the solar cell when the terminal voltage of the battery is less than the threshold voltage.

In addition, the apparatus may further comprise a first regulator controlling an operation power supplied from the battery to the main controller; and a second regulator controlling the power generated in the solar cell to be supplied to the secondary controller. Also, the secondary controller may monitor the battery and supply the power generated in the solar cell to the main controller through the second regulator. Also, the secondary controller may stop an operation of the first regulator and supply the power generated in the solar cell to the main controller when an energy state level of the battery is less than a predetermined threshold.

In addition, the second regulator may supply the power generated in the solar cell to the secondary controller when the power generated in the solar cell is not less than a cell threshold voltage.

In order to achieve the objectives of the present invention, a method for controlling a streetlamp system using solar charging may be provided. The streetlamp system may comprise a main controller, a secondary controller, a battery, and a solar cell. In the streetlamp system, when a terminal voltage of the battery is less than a threshold voltage and the main controller is downed, the secondary controller is operated by using power generated in the solar cell and revives the main controller so that the main controller controls the streetlamp system.

In addition, a first regulator located between the battery and the main controller may control an operation power supplied from the battery to the main controller, and a second regulator located between the solar cell and the secondary controller may control the power generated in the solar cell to be supplied to the secondary controller. Also, the secondary controller may stop an operation of the first regulator and supply the power generated in the solar cell to the main controller when an energy state level of the battery is less than a predetermined threshold.

In addition, the second regulator may supply the power generated in the solar cell to the secondary controller when the power generated in the solar cell is not less than a cell threshold voltage.

According to the solar charging control apparatus and the method for the same, even when the main controller of the solar charging control apparatus is downed, the solar charging control apparatus can be ordinarily operated by using solar energy generation.

Also, costs demanded for managing a solar charging system which is installed in a remote place can be saved.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
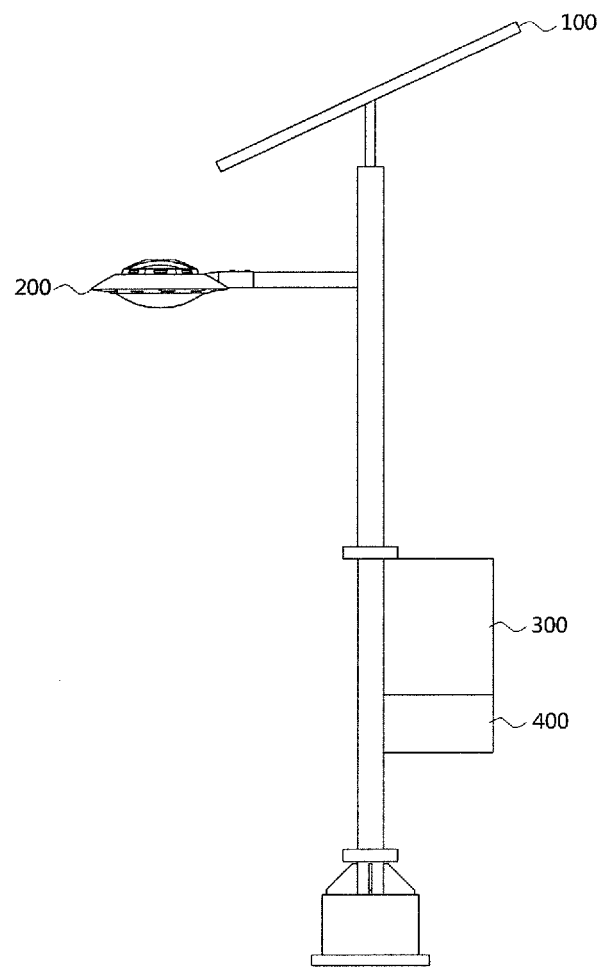
FIG. 1 is a block diagram illustrating a configuration of a solar streetlamp system comprising a solar charging control apparatus according to an exemplary embodiment of the present disclosure.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the preferred exemplary embodiments according to the present disclosure will be explained in detail by referring to accompanying figures.

FIG. 1 is a block diagram illustrating a configuration of a solar streetlamp system comprising a solar charging control apparatus according to an exemplary embodiment of the present disclosure.

The solar streetlamp system may comprise a solar cell 100, a streetlamp 200, a solar charging control apparatus 300, and a battery 400.

The solar cell 100 corresponds to a power generation unit which can generate power by using sunlight. That is, the solar cell 100 may generate solar power. The solar cell 100 may be fabricated using semiconductor material such as silicon, gallium arsenide, cadmium sulfide, etc. The solar cell 100 may be formed in a solar cell panel structure in which multiple cell modules are aggregated.

The streetlamp 200 outputs lights by using power generated in the solar cell. Here, the power generated in the solar cell may be stored in the battery 400, and then supplied to the streetlamp 200 from the battery 400. Here, it is preferred that the streetlamp 200 outputting light comprises light-emitting diode (LED) elements having high efficiency. However, various types of lamps such as a halogen lamp, a mercury lamp, etc. may be used as the streetlamp 200.

The solar charging control apparatus 300 may comprise a main controller 310 and a secondary controller 330, which will be explained later. Here, although the solar charging control apparatus 300 is illustrated as including a battery management system (BMS) 320, the battery management system 320 may be implemented as an independent entity separated from the solar charging control apparatus 300.

The battery 400 is charged using the power generated in the solar cell 100, and the power stored in the battery 400 may be outputted to the streetlamp 200, i.e., a load. The battery 400 according to an exemplary embodiment may preferably be a lithium-ion battery or a lead-acid battery. However, various exemplary embodiments are not restricted thereto.

Also, the battery 400 may be constructed as a battery pack in which a plurality of battery elements are connected in parallel or in series according to a desired load terminal voltage.

Figure 2:
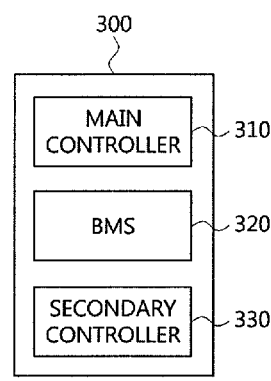
FIG. 2 is a block diagram illustrating a configuration of a solar charging control apparatus according to an exemplary embodiment of the present disclosure.

FIG. 2 is a block diagram illustrating a configuration of a solar charging control apparatus according to an exemplary embodiment of the present disclosure.

As described above, the solar charging control apparatus 300 may comprise the main controller 310 and the secondary controller 330. The apparatus 300 may control charge/discharge operations for the battery 400 by using the power generated in the solar cell 100, and control operation of the streetlamp 200. Here, since the solar charging control apparatus 300 (i.e., the main controller 310 and the secondary controller 330) controls the battery 400, the battery management system 320, and the streetlamp 200, the BMS 320 may be implemented as an independent entity separated from the solar charging control apparatus 300.

The main controller 310 may control charge/discharge operations for the battery 400 and on-off operations of the streetlamp 200. That is, the main controller 310 may use the power generated in the solar cell 100 to charge the battery 400, and perform on-off control operations of the streetlamp 150 which operates based on the power stored in the battery 400.

The main controller 310 may control charge/discharge operations for the battery 400 according to varying sunshine duration. For example, if the charging of the battery 400 is stopped at sunset, the main controller 420 may control the streetlamp 200 to operate using the power stored in the battery 400. On the contrary, if the charging of the battery 400 is resumed at sunrise, the main controller 420 may turn off the streetlamp 200.

For example, the main controller 310 can determine sunset or sunrise based on an output voltage of the solar cell. In this case, since a voltage over a certain level may be output by the solar cell 100 even when rain clouds exist or a sun is covered, the streetlamp 200 may not be operated. Thus, the main controller 310 may also automatically control a time of turning-on the streetlamp and a time of turning-off the streetlamp according to season or weather.

In the case that the battery 400 is being charged by the solar cell 100 or the power is being outputted from the battery 400 to the streetlamp 200, the charge/discharge operations for the battery 400 are controlled by the main controller 310. In this case, if a surplus power exists in the battery, the secondary controller 330 is transitioned to a sleep mode by the main controller 310.

Here, the sleep mode may mean a state in which the operation of the secondary controller 330 is not completely turned off and only a small amount of power is being consumed. If the operation of the main controller 310 is stopped, the secondary controller 330 may wake up from the sleep mode and revive the main controller 310. The detailed procedure for waking up and reviving will be explained later.

The battery management system 320 may measure a terminal voltage of the battery 400. When the measured terminal voltage is below a predetermined threshold voltage, the battery management system 320 may turn off the main controller 310 in order to protect the battery 400.

Especially, in a case of a lithium-ion battery in which the battery management system is installed, since its output is completely cut off when its terminal voltage is below a cut-off voltage, a voltage supplied to the main controller 310 may become 0.

When the main controller 310 is turned off, the secondary controller 330 may revive the main controller 310 by using the power generated in the solar cell 100. That is, the secondary controller 330 may control a second regulator (which will be explained later) to supply a power to the main controller 310 so that the main controller 310 is revived and performs charge/discharge control operations again.

Figure 3:
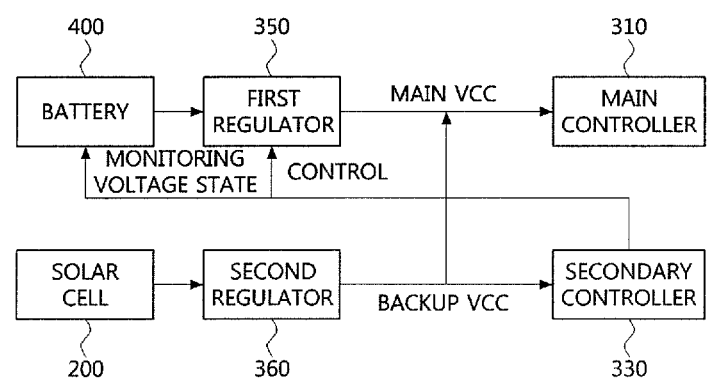
FIG. 3 is a block diagram illustrating a detail configuration of a solar charging control apparatus according to another exemplary embodiment of the present disclosure.

FIG. 3 is a block diagram illustrating a detail configuration of a solar charging control apparatus according to another exemplary embodiment of the present disclosure.

As illustrated in FIG. 3, the solar charging control apparatus 300 may further comprise a first regulator 350 supplying an operation power to the main controller 310, and a second regulator 360 supplying an operation power to the secondary controller 330.

The first regulator 350 and the second regulator 360 regulate high voltage to low voltage, and supply respective operation powers to the main controller 310 and the secondary controller 330. Thus, in order to ordinarily output an operation voltage of 5V, powers having a voltage not less than 7V should be supplied to the first and second regulators.

However, according to characteristics of the solar cell 200, the output voltage of the solar cell may start increasing at sunrise from 0V, and so the output voltage (i.e., a backup VCC) of the second regulator 360 may become unstable. That is, the output voltage of the solar cell 200 does not output 7V from the beginning, and may increase linearly from 0V to 7V. For example, for the period during which the output voltage increases from 0V to 7V, the secondary controller 330 may operate unstably due to unstableness of the input voltage (i.e., the output voltage of the solar cell). Thus, a Zener diode, which can supply the input voltage only when the output voltage of the solar cell is over 7V, may be used to prevent the malfunction of the secondary controller 330 (e.g., through 'brown-out detection operation').

Figure 4:
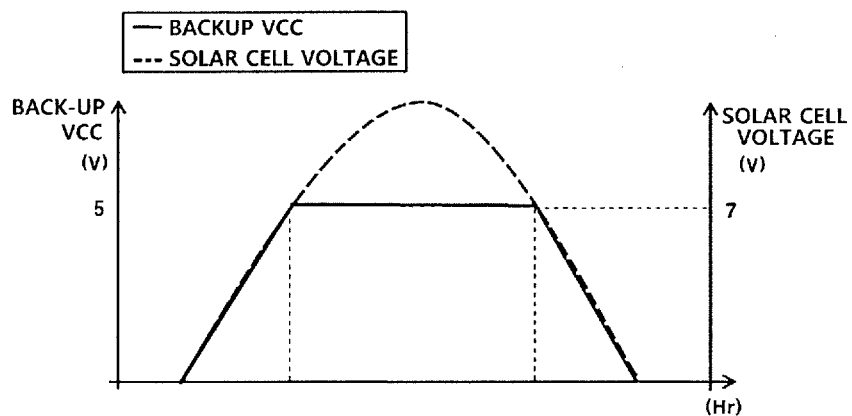
FIG. 4 is a graph illustrating a relation between a backup VCC and an output voltage of a solar cell according to an exemplary embodiment of the present disclosure.

FIG. 4 is a graph illustrating a relation between a backup VCC and an output voltage of a solar cell according to an exemplary embodiment of the present disclosure.

As illustrated in FIG. 4, as quantity of generated power increases in the solar cell 200, a backup VCC may be generated in the second regulator 360 for the period during which the output voltage of the solar cell 200 is over 7V, and provided to the secondary controller 330.

The main controller 310 may control charge/discharge operations of the battery 400 and on/off operations of the streetlamp 200. For the operation of the main controller 310, an operation power for the main controller 310 may be provided from the battery 400, and the operation power is provided to the main controller 310 through a main VCC terminal.

In a case that a status of the battery 400 is good, the secondary controller 330 may enter into a sleep mode, be turned-off at sunset, be reset at sunrise, and enter into the sleep mode again thereby minimizing power consumption.

When the operation of the main controller 310 is stopped, the secondary controller 330 may wake up from the sleep mode and resume its operation. In this case, for the operation of the secondary controller 330, an operation power is provided to the secondary controller 330 from the solar cell 200, and the operation power is provided to the secondary controller 330 through a backup VCC terminal.

Since the backup VCC terminal supplies the operation power only when the solar cell 200 can generate power, the backup power can be generated at sunrise. The backup power may wake the secondary controller 330 up, and be provided to the main controller 310. In this case, the secondary controller 330 may perform diagnostics on the battery 400 by using an analog-to-digital converter (ADC).

In a case that the status of the battery 400 is not good, the secondary controller 330 may turn off the first regulator 350 to prevent a collision between the backup VCC and the main VCC and supply power to the main controller 310 via the backup VCC terminal. A semiconductor switch such as metal-oxide semiconductor field-effect-transistor may exist between the second regulator 360 and the main VCC terminal.

For the secondary controller 330, a reference voltage may be set by using the backup VCC voltage, and the reference voltage may be an operation basis of the ADC function, an internal oscillator, etc. If the backup VCC voltage is unstable, such the functions of the secondary controller 330 may operate incorrectly. Thus, an additional circuit using a Zener diode may be configured so that the backup power is provided to the second regulator 360 only when the output voltage of the solar cell 200 is not less than 7V (i.e., a cell threshold voltage of a cell).

Figure 5:
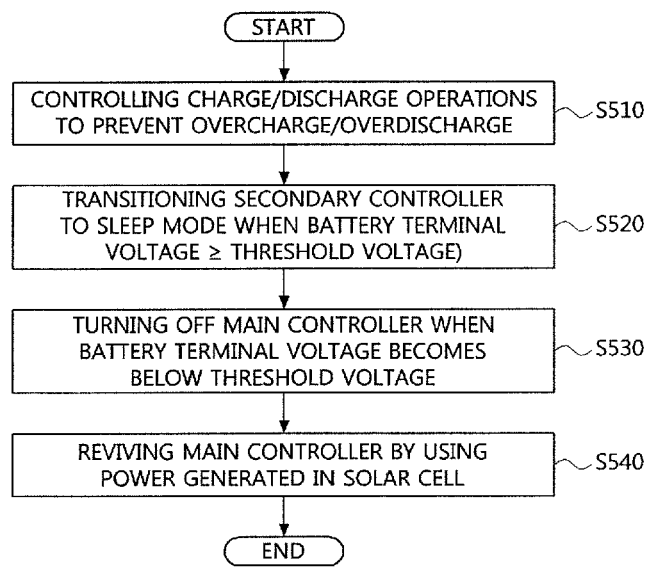
FIG. 5 is a sequence chart illustrating a method for controlling solar charging according to an exemplary embodiment of the present disclosure.

FIG. 5 is a sequence chart illustrating a method for controlling solar charging according to an exemplary embodiment of the present disclosure.

The method for controlling solar charging, according to an exemplary embodiment of the present disclosure, may be performed by the solar charging control apparatus 300 comprising the battery 400, the main controller 310, and the secondary controller 330.

First, the main controller 310 may control charge/discharge operations of the battery 400, and prevent overcharge and overdischarge of the battery 400 (S510).

The battery is charged for sunshine duration, and is discharged for sunset duration. That is, the battery 400 is charged and the streetlamp 200 is turned off for the sunshine duration. Also, the battery 400 is discharged and the streetlamp 200 is turned on for the sunset duration. The main controller 310 may use a pulse-width-modulation (PWM) control method to prevent the overcharge and overdischarge of the battery.

The energy state level of the battery may be determined based on charge quantity of the battery. If a discharge starts from the charge quantity, the terminal voltage of the battery slowly decreases, and finally reaches a threshold voltage. When the terminal voltage of the battery decreases below the threshold voltage, overdischarge should be prevented to prevent a damage of the battery. Similarly, the overcharge of the battery should be prevented.

If the terminal voltage of the battery is not less than the threshold voltage, the secondary controller 330 may be in a wait state (i.e., the sleep mode) (S520).

In a case that the battery 400 ordinarily supplies power to the streetlamp 200, the main controller 310 may transition the state of the secondary controller 330 to the sleep mode so that power consumption decreases. That is, when the battery voltage is not less than the threshold voltage, the main controller 310 may transition the state of the secondary controller 330 to the sleep mode. Also, the main controller 310 may turn off the secondary controller 330 at sunset, and transition the secondary controller 330 again to the sleep mode.

In consideration of the power consumed by the streetlamp 200 for the sunset duration and the charge amount of the battery for the sunshine duration, it is preferred that a solar street system having a charge capacity capable of supplying enough power to the streetlamp 200. However, according to various external factors (e.g., lack of amount of sunshine), enough power may not be provided to the streetlamp 200, and the voltage of the battery 400 may become below the threshold voltage.

To explain the method for controlling solar charging according to the present disclosure, it may be considered a situation in which the solar cell cannot generate enough power, for example, for the sunset duration. If the sunlight does not exist, the voltage of the battery may become below the threshold voltage, the battery management system 320 may check the terminal voltage of the battery, and turn off the main controller 310 in order to prevent the damage of the battery (S530).

After the main controller 310 is turned off, the secondary controller 330 may revive the main controller 310 by using the power generated in the solar cell (S540).

For the operations of the main controller 310 and the secondary controller 330, power should be provided to each of them. Thus, the first regulator 350 may output the main power received from the battery to the main controller 310, and the second regulator 360 may output the backup power received from the solar cell to the secondary controller 330.

When the voltage of the battery 400 becomes below the threshold voltage and the main controller 310 is turned off by the battery management system 320, the secondary controller 330 may turn off the first regulator 350 and supply the backup power generated in the solar cell to the main controller 310. In this case, in order to stably supply the backup power, the output of the solar cell can be provided to the second regulator 360 only when the output voltage of the solar cell is not less that the cell threshold voltage.

According to the solar charging control apparatus and the method for the same, even when the main controller of the solar charging control apparatus is downed, the solar charging control apparatus can be ordinarily operated by using solar energy generation. Also, costs demanded for managing a solar charging system which is installed in a remote place can be saved.

While the example embodiments of the present invention and their advantages have been described in detail, it should be understood that various changes, substitutions and alterations may be made herein without departing from the scope of the invention.

What is claimed is:

1. An apparatus for controlling solar charging, the apparatus comprising:
    a main controller controlling charge/discharge operations of a battery storing power generated in a solar cell in order to protect overcharge and overdischarge of the battery; and
    a secondary controller maintaining a sleep mode when a terminal voltage of the battery is not less than a threshold voltage and reviving the main controller by using power generated in the solar cell when the terminal voltage of the battery is less than the threshold voltage.

2. The apparatus according to claim 1, further comprising:
    a first regulator controlling an operation power supplied from the battery to the main controller; and
    a second regulator controlling the power generated in the solar cell to be supplied to the secondary controller.

3. The apparatus according to claim 2, wherein the secondary controller monitors the battery and supplies the power generated in the solar cell to the main controller through the second regulator.

4. The apparatus according to claim 2, wherein the secondary controller stops an operation of the first regulator and supplies the power generated in the solar cell to the main controller when an energy state level of the battery is less than a predetermined threshold.

5. The apparatus according to claim 4, wherein the second regulator supplies the power generated in the solar cell to the secondary controller when the power generated in the solar cell is not less than a cell threshold voltage.

6. A method for controlling a streetlamp system using solar charging, the streetlamp system comprising a main controller, a secondary controller, a battery, and a solar cell,
    wherein, when a terminal voltage of the battery is less than a threshold voltage and the main controller is downed, the secondary controller is operated by using power generated in the solar cell and revives the main controller so that the main controller controls the streetlamp system.

7. The method according to claim 6, wherein a first regulator located between the battery and the main controller controls an operation power supplied from the battery to the main controller, and a second regulator located between the solar cell and the secondary controller controls the power generated in the solar cell to be supplied to the secondary controller.

8. The method according to claim 7, wherein the secondary controller stops an operation of the first regulator and supplies the power generated in the solar cell to the main controller when an energy state level of the battery is less than a predetermined threshold.

9. The method according to claim 8, wherein the second regulator supplies the power generated in the solar cell to the secondary controller when the power generated in the solar cell is not less than a cell threshold voltage.

* * * * *